United States Patent
LeBlanc et al.

(10) Patent No.: US 9,394,792 B2
(45) Date of Patent: Jul. 19, 2016

(54) REDUCED HEIGHT LIGAMENTS TO MINIMIZE NON-INTEGRAL VIBRATIONS IN ROTOR BLADES

(71) Applicant: UNITED TECHNOLOGIES CORPORATION, Hartford, CT (US)

(72) Inventors: Ryan Edward LeBlanc, Glastonbury, CT (US); Kevin J. Cummings, West Hartford, CT (US); Amr Ali, South Windsor, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 868 days.

(21) Appl. No.: 13/632,352

(22) Filed: Oct. 1, 2012

(65) Prior Publication Data

US 2014/0093375 A1    Apr. 3, 2014

(51) Int. Cl.
*F01D 5/10* (2006.01)
*F01D 25/06* (2006.01)
*F02C 6/08* (2006.01)

(52) U.S. Cl.
CPC *F01D 5/10* (2013.01); *F01D 25/06* (2013.01); *F02C 6/08* (2013.01); *Y10T 29/49236* (2015.01)

(58) Field of Classification Search
CPC ........... F01D 5/10; F01D 9/065; F01D 25/04; F01D 25/06; F01D 25/14; F02C 6/08
See application file for complete search history.

(56) References Cited

U.S. PATENT DOCUMENTS

| | | | |
|---|---|---|---|
| 4,329,114 A | 5/1982 | Johnston et al. | |
| 6,086,326 A * | 7/2000 | Honda et al. | 415/145 |
| 6,428,271 B1 | 8/2002 | Ress, Jr. et al. | |
| 6,582,183 B2 | 6/2003 | Eveker et al. | |
| 7,094,029 B2 | 8/2006 | Taylor et al. | |
| 7,594,403 B2 | 9/2009 | Cadieux | |
| 7,785,066 B2 | 8/2010 | Bil et al. | |
| 8,235,646 B2 | 8/2012 | Lace | |
| 2008/0072566 A1 | 3/2008 | Eleftheriou et al. | |
| 2010/0284789 A1 | 11/2010 | Brooks et al. | |
| 2011/0058941 A1 | 3/2011 | Behaghel et al. | |
| 2012/0070271 A1 * | 3/2012 | Urban et al. | 415/145 |

FOREIGN PATENT DOCUMENTS

| | | |
|---|---|---|
| FR | 2972492 A1 | 9/2012 |
| JP | S62168999 A | 7/1987 |
| JP | 2003023222 A | 1/2003 |
| WO | 2013191798 A1 | 12/2013 |

* cited by examiner

*Primary Examiner* — Christopher Verdier
*Assistant Examiner* — Juan G Flores
(74) *Attorney, Agent, or Firm* — Bachman & LaPointe, P.C.

(57) ABSTRACT

A system for minimizing non-integral vibrations in rotor blades located in a compressor section of a gas turbine engine includes a casing having a plurality of bleed slots, at least one of the bleed slots being located in close proximity to a row of rotor blades, a plurality of structural ligaments, at least one of the structural ligaments extending between two adjacent ones of the bleed slots; and a channel for reducing the height of at least one of the structural ligaments so as to minimize the non-integral vibrations in the rotor blades in the row.

13 Claims, 5 Drawing Sheets

REDUCED HEIGHT LIGAMENTS TO MINIMIZE NON-INTEGRAL VIBRATIONS IN ROTOR BLADES

BACKGROUND

The present disclosure relates to a system for minimizing non-integral vibrations in rotor blades by using reduced height structural ligaments.

Engine bleed systems are designed to provide flow passages that allow air to be bled from a compressor section of a gas turbine engine. The bleed air may be used to eject dirt/hail/ice from the compressor section and/or may be used for surge/stall recovery. Due to the geometry of the passageways that form the bleed slots, acoustic response issues can arise that cause non-integral vibrations in nearby rotor blades. These non-integral vibrations of the rotor blades may result from the height of the passageways that form the bleed slots/ducts. A system for minimizing and/or eliminating these non-integral vibrations is desirable.

SUMMARY

In accordance with the present invention, there is provided a system for minimizing non-integral vibrations in rotor blades, which system broadly comprises a casing having a plurality of bleed slots, at least one of the bleed slots being located in close proximity to a row of rotor blades; a plurality of structural ligaments; at least one of the structural ligaments extending between two adjacent ones of the bleed slots; and means for reducing the height of at least one of the structural ligaments so as to minimize the non-integral vibrations in the rotor blades in the row.

As set forth in another and alternative embodiment, the system further comprises a plurality of valves for sealing the bleed slots and for preventing a flow of air through the bleed slots.

As set forth in another and alternative embodiment, the height reducing means comprises means for creating a gap between an end surface of at least one of the structural ligaments and at least one of the valves.

As set forth in another and alternative embodiment, the means for creating the gap comprises a channel in at least one structural ligament.

As set forth in another and alternative embodiment, the channel extends from a first end of at least one structural ligament to a second end of at least one structural ligament.

As set forth in another and alternative embodiment, the channel is formed by a curved surface of at least one structural ligament.

As set forth in another and alternative embodiment, the gap creating means is present in each of the structural ligaments.

As set forth in another and alternative embodiment, the rotor blades rotate about an axis and two opposed ends of the structural ligament are inclined at a non-perpendicular angle with respect to the axis.

As set forth in another and alternative embodiment, each of the structural ligaments connects two sidewalls of a duct forming one of the bleed slots.

As set forth in another and alternative embodiment, the means for reducing the height of the structural ligaments reduces the height of at least one of the structural ligaments to sufficiently change a natural frequency of air circulating in a passageway forming the bleed slots and thereby minimizing the non-integral vibrations.

As set forth in another and alternative embodiment, the rotor blades are located in a compressor section of a gas turbine engine.

Further in accordance with the present disclosure, there is provided a process for minimizing non-integral vibrations in rotor blades, comprising the steps of: providing a casing having a plurality of bleed slots with at least one of the bleed slots being located in close proximity to a row of rotor blades; providing a plurality of structural ligaments with at least one of the structural ligaments extending between two adjacent ones of the bleed slots; and fabricating at least one of the structural ligaments to have a reduced height so as to minimize the non-integral vibrations in the rotor blades in the row.

In another and alternative embodiment, the fabricating step comprises creating a gap between an end surface of at least one structural ligament and at least one valve.

In another and alternative embodiment, the gap creating step comprises forming a channel in at least one structural ligament.

In another and alternative embodiment, the channel forming step comprises forming a channel which extends from a first end of the at least one structural ligament to a second end of the at least one structural ligament.

In another and alternative embodiment, the channel forming step further comprises forming a curved surface on the at least one structural ligament.

In another and alternative embodiment, the fabricating step comprises reducing the height of at least one structural ligament to sufficiently change a natural frequency of air circulating in a passageway forming the bleed slots and thereby minimizing the non-integral vibrations.

In another and alternative embodiment, the fabricating step comprises reducing the height of all of the structural ligaments.

Other details of the reduced height ligaments to minimize non-integral vibrations in rotor blades are set forth in the following detailed description and the accompanying drawings wherein like reference numerals depict like elements.

DETAILED DESCRIPTION

Figure 1A:
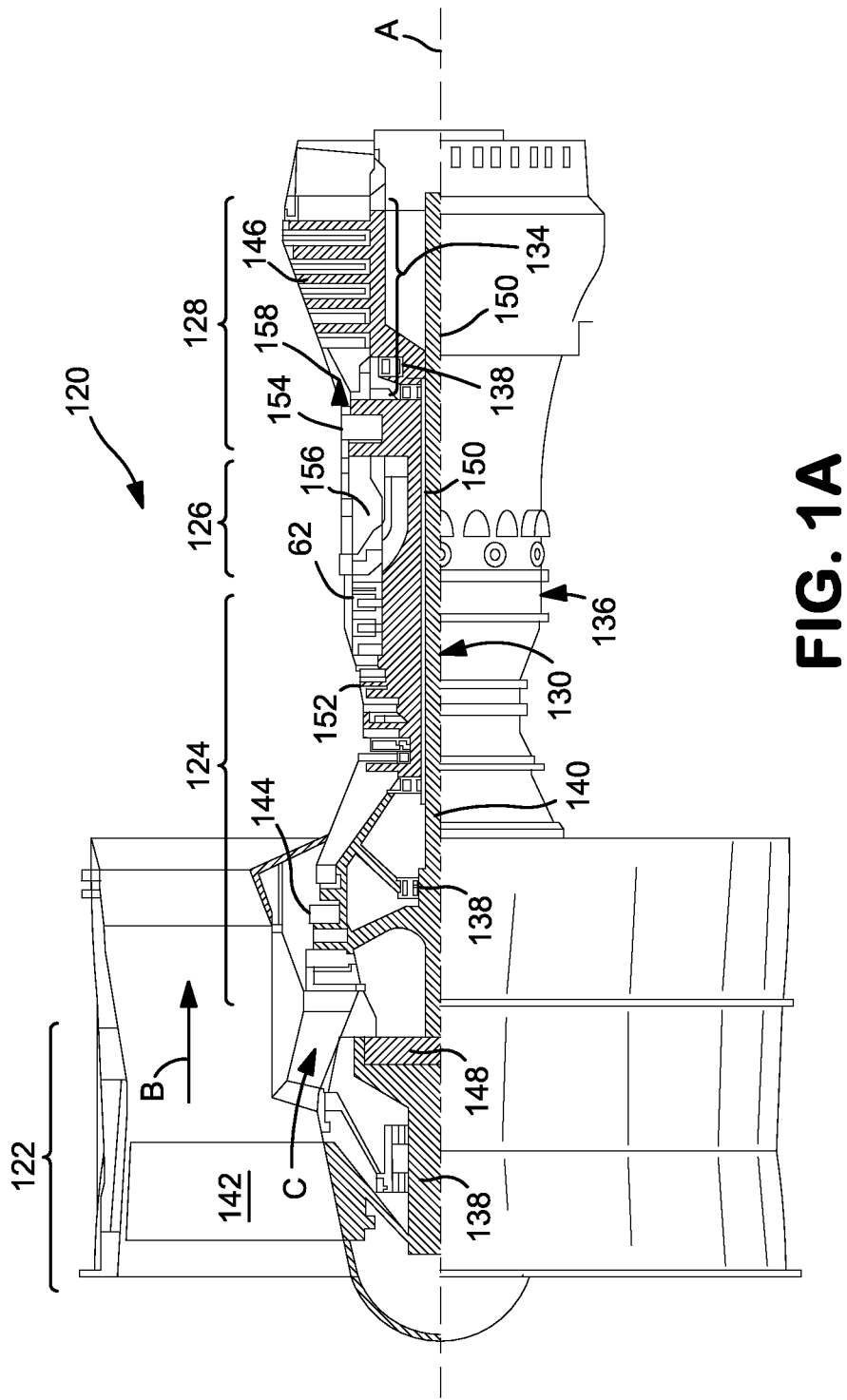
FIG. 1A is a sectional view of a gas turbine engine.

FIG. 1A schematically illustrates an example gas turbine engine 120 that includes a fan section 122, a compressor section 124, a combustor section 126 and a turbine section 128. Alternative engines might include an augmenter section (not shown) among other systems or features. The fan section 122 drives air along a bypass flow path B while the compressor section 124 draws air in along a core flow path C where air is compressed and communicated to a combustor section 126. In the combustor section 126, air is mixed with fuel and ignited to generate a high pressure exhaust gas stream that expands through the turbine section 128 where energy is extracted and utilized to drive the fan section 122 and the compressor section 124.

Although the disclosed non-limiting embodiment depicts a turbofan gas turbine engine, it should be understood that the concepts described herein are not limited to use with turbofans as the teachings may be applied to other types of turbine engines; for example a turbine engine including three spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 120 generally includes a low speed spool 130 and a high speed spool 132 mounted for rotation about an engine central longitudinal axis A relative to an engine static structure 136 via several bearing systems 138. It should be understood that various bearing systems 138 at various locations may alternatively or additionally be provided.

The low speed spool 130 generally includes an inner shaft 140 that connects a fan 142 and a low pressure (or first) compressor section 144 to a low pressure (or first) turbine section 146. The inner shaft 140 drives the fan 142 through a speed change device, such as a geared architecture 148, to drive the fan 142 at a lower speed than the low speed spool 130. The high speed spool 132 includes an outer shaft 150 that interconnects a high pressure (or second) compressor section 152 and a high pressure (or second) turbine section 154. The inner shaft 140 and the outer shaft 150 are concentric and rotate via the bearing systems 138 about the engine central longitudinal axis A.

A combustor 156 is arranged between the high pressure compressor 152 and the high pressure turbine 154. In one example, the high pressure turbine 154 includes at least two stages to provide a double stage high pressure turbine 154. In another example, the high pressure turbine 154 includes only a single stage. As sued herein, a "high pressure" compressor or turbine experiences a higher pressure than a corresponding "low pressure" compressor or turbine.

The example low pressure turbine 146 has a pressure ratio that is greater than about 5. The pressure ratio of the example low pressure turbine 146 is measured prior to an inlet of the low pressure turbine 146 as related to the pressure measured at the outlet of the low pressure turbine 146 prior to an exhaust nozzle.

A mid-turbine frame 158 of the engine static structure 136 is arranged generally between the high pressure turbine 154 and the low pressure turbine 146. The mid-frame turbine 158 further supports bearing systems 138 in the turbine section 128 as well as setting airflow entering the low pressure turbine 146.

The core airflow C is compressed by the low pressure compressor 144 then by the high pressure compressor 152 mixed with fuel and ignited in the combustor 156 to produce high speed exhaust gases that are then expanded through the high pressure turbine 154 and low pressure turbine 146. The mid-turbine frame 158 includes vanes 160, which are in the core airflow path and function as an inlet guide vane for the low pressure turbine 146. Utilizing the vane 160 of the mid-turbine frame 158 as the inlet guide vane for low pressure turbine 146 decreases the length of the low pressure turbine 146 without increasing the axial length of the mid-turbine frame 158. Reducing or eliminating the number of vanes in the low pressure turbine 146 shortens the axial length of the turbine section 128. Thus, the compactness of the gas turbine engine 120 is increased and a higher power density may be achieved.

The disclosed gas turbine engine 120 in one example is a high-bypass geared aircraft engine. In a further example, the gas turbine engine 120 includes a bypass ratio greater than about six, with an example embodiment being greater than about ten. The example geared architecture 148 is an epicyclical gear train, such as a planetary gear system, star gear system or other known gear system, with a gear reduction ratio of greater than about 2.3.

In one disclosed embodiment, the gas turbine engine 120 includes a bypass ratio greater than about 10:1 and the fan diameter is significantly larger than an outer diameter of the low pressure compressor 144. It should be understood however that the above parameters are only exemplary of one embodiment of a gas turbine engine including a geared architecture and that the present disclosure is applicable to other gas turbine engines.

The example gas turbine engine includes the fan 142 that comprises in one non-limiting embodiment less than about twenty-six fan blades. In another non-limiting embodiment, the fan section 122 includes less than about twenty fan blades. Moreover, in one disclosed embodiment, the low pressure turbine 146 includes no more than about six turbine rotors schematically illustrated at 134. In another non-limiting example embodiment, the low pressure turbine 146 includes about three turbine rotors. A ration between the number of fan blades 142 and the number of low pressure turbine rotors is between about 3.3 and about 8.6. The example low pressure turbine 146 provides the driving power to rotate the fan section 122 and therefore the relationship between the number of turbine rotors 134 in the low pressure turbine 146 and the number of blades 142 in the fan section 122 discloses an example gas turbine engine 120 with increased power transfer efficiency.

The exemplary engine 120 which is disclosed hereinabove may have a compressor section 124 with a plurality of circumferential bleed slots separated by a plurality of structural ligaments. In accordance with the present disclosure, the height of structural ligaments located between adjacent bleed slots is shortened to change the frequency of the bleed slot cavity and minimize the vibrations in adjacent rotor blades. The shortened height of the cavity forming a respective bleed slot may be accomplished by creating a gap between an inner diameter of a valve that closes the bleed slots and the tops of the ligaments.

Figure 1B:
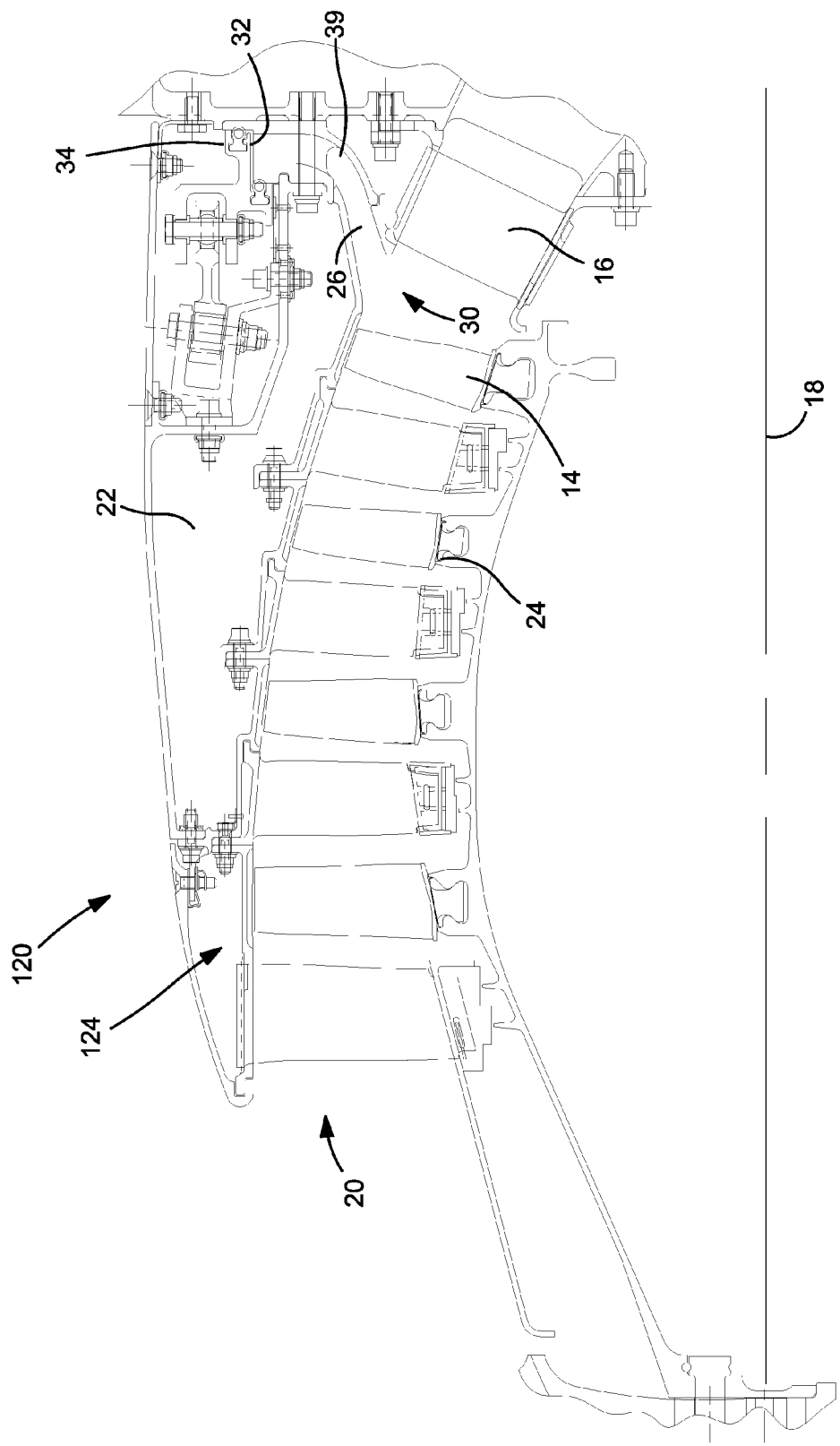
FIG. 1B is a sectional view of a compressor section of a gas turbine engine.

Referring now to FIG. 1B, there is shown a portion of a compressor section 124 of the gas turbine engine 120. The compressor section 124 includes a plurality of rotating blades 14 and stationary vanes 16. The blades 14 rotate about a central axis 18. A main gas flow path 20 is created between a casing 22 and the rotating disks 24 on which the rotating blades 14 are mounted.

Referring now to FIGS. 1B-3, a plurality of substantially circumferential bleed slots 26 are formed in the casing 22. The bleed slots 26 may be used to bleed air from the main gas flow path 20 and forward the bleed air to another section of the engine 120. Each of the bleed slots 26 in the casing 22 is separated by a structural ligament 28. Further, each of the bleed slots 26 has an inlet 30 and an outlet 32. The outlet 32 of each bleed slot 26 may be closed by a valve 34 so as to prevent a flow of air through the respective bleed slot 26.

Figure 2:
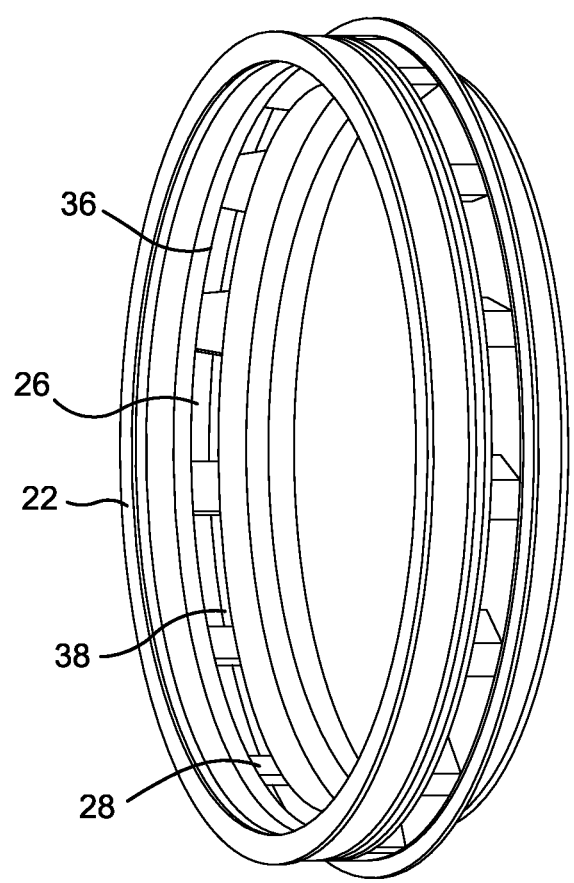
FIG. 2 is a schematic representation of a portion of the casing in the compressor section of FIG. 1 having a plurality of bleed slots.
Figure 3:
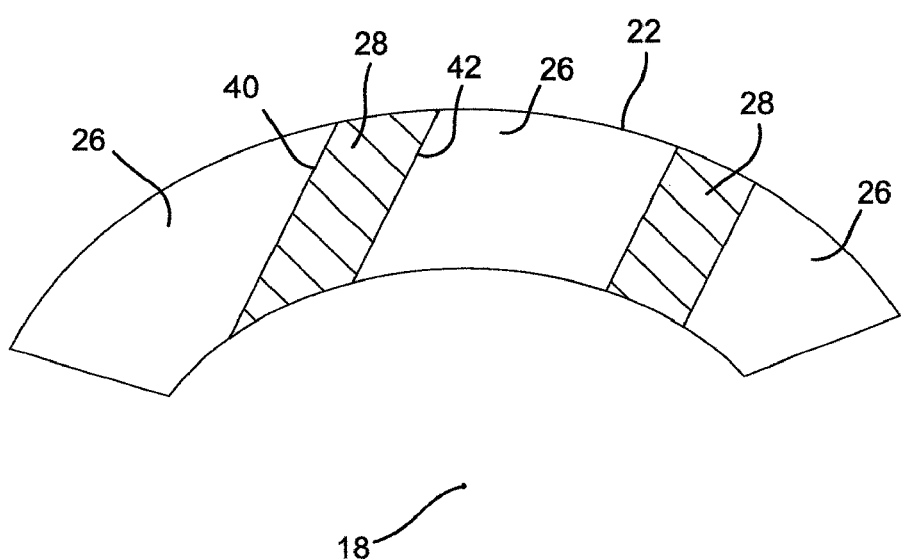
FIG. 3 is a sectional view of a portion of FIG. 2.

Referring now to FIGS. 2 and 3, each of the structural ligaments 28 is joined to each of the sidewalls 36 and 38 of the ducts or passageways 39 forming the bleed slots 26. Further, referring now to FIG. 3, each of the structural ligaments 28 has a first end 40 and a second end 42 opposed to the first end 40. The first and second ends 42 may be angled at a non-perpendicular angle with respect to the rotational axis 18. As can be seen from FIG. 2, each structural ligament 28 extends between two adjacent ones of said bleed slots 26.

Figure 4:
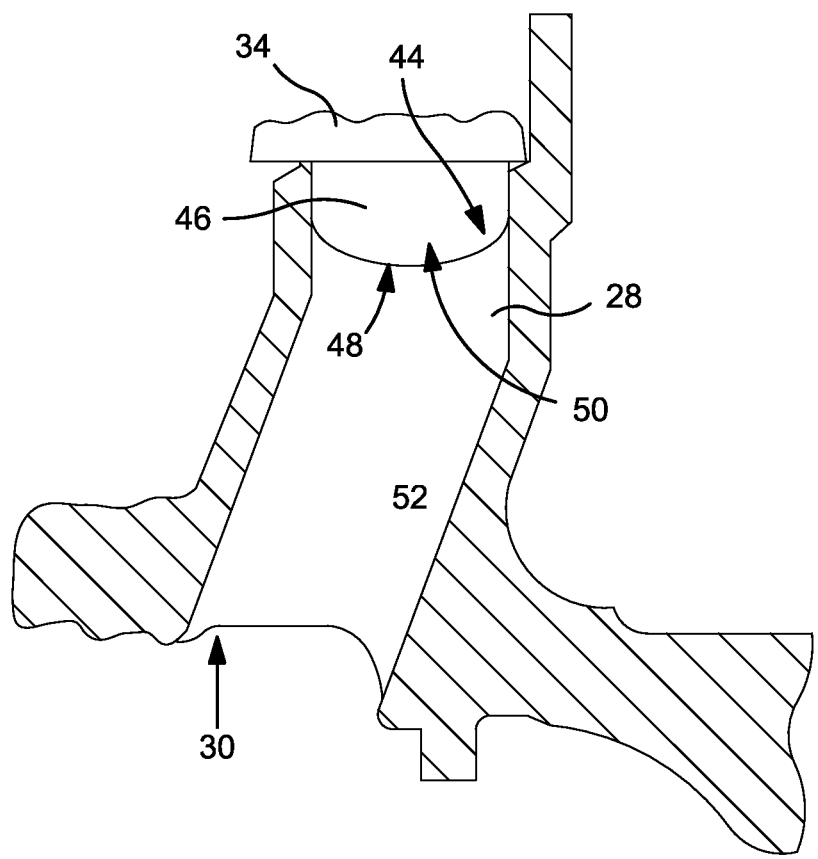
FIG. 4 is a schematic view showing a structural ligament having a reduced height.
Figure 5:
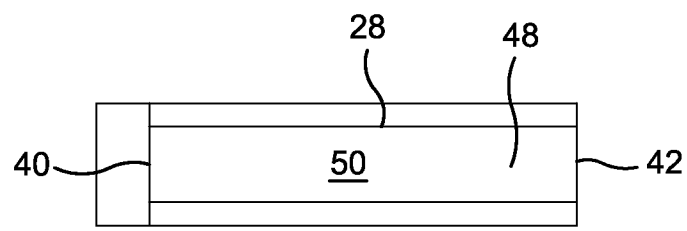
FIG. 5 is a top view of a structural ligament in accordance with the present disclosure.

Referring now to FIG. 4, in order to minimize the non-integral vibrations in the rotor blades 14 in close proximity to the inlet 30 of the bleed slots 26, one or more of the structural ligaments 28 is provided with a means 44 for reducing its height. The reducing means may comprise means for creating a gap 46 between an outer end surface 48 of a respective structural ligament 28 and at least one of the valves 34. The means for creating the gap 46 comprises a channel 50 in the respective structural ligament 28. As shown in FIG. 5, the channel 50 may extend from the first end 40 to the second end 42 of the respective structural ligament 28. The channel 50 allows air to flow from one bleed slot 26 to an adjacent bleed slot 26.

The channel 50 may be formed by providing the end surface 48 with a curved or arcuate shape 52. If desired, each of the structural ligaments 28 may be provided with a channel 50.

The channel or channels 50 are sized so as to reduce the height of the structural ligament(s) 28 so as to sufficiently change a natural frequency of the air circulating in the passageway forming each bleed slot 26 that the non-integral vibrations in the rotor blades 14 in close proximity to the bleed slots 26 are minimized.

Each of the channels 50 may be fabricated in any desired manner. For example, the structural ligaments 28 with the channels 50 may be integrally formed with the casing 22 such as by casting. Alternatively, the channels 50 may be formed by machining the channels 50 into respective ones of the structural ligaments 28 or all of the structural ligaments 28. When fabricating the channels 50, the channels 50 should be of such a size an depth that the support function of the ligament(s) 28 are not compromised.

As can be seen from the foregoing description, a simple and cost effective way for minimizing non-integral vibration response in rotor blades adjacent or in close proximity to a bleed duct has been provided.

While the bleed ducts have been described as being located in a compressor section of a gas turbine engine, the means for minimizing the non-integral vibration response could be incorporated into bleed ducts used in other portions of the gas turbine engine such as the turbine section.

There has been provided in accordance with the present disclosure reduced height ligaments to minimize non-integral vibrations in rotor blades. While the reduced height ligaments have been described in the context of specific embodiments thereof, other unforeseen alternatives, modifications, and variations may become apparent to those skilled in the art having read the foregoing description. Accordingly, it is intended to embrace those alternatives, modifications, and variations as fall within the broad scope of the appended claims.

What is claimed is:

1. A system for minimizing non-integral vibrations in rotor blades, comprising:
    a casing having a plurality of bleed slots;
    at least one of said bleed slots being located in close proximity to a row of rotor blades;
    a plurality of structural ligaments;
    at least one of said structural ligaments extending between two adjacent ones of said bleed slots;
    a plurality of valves for sealing said bleed slots and for preventing a flow of air through said bleed slots; and
    a channel in said at least one structural ligament, wherein said rotor blades rotate about an axis and two opposed ends of said structural ligament are inclined at a non-perpendicular angle with respect to said axis.

2. The system of claim 1, wherein said channel comprises a gap between an end surface of said at least one of said structural ligaments and at least one of said valves.

3. The system of claim 2, wherein said channel is present in each of said structural ligaments.

4. The system of claim 1, wherein said channel extends from a first end of said at least one structural ligament to a second end of said at least one structural ligament.

5. The system of claim 4, wherein said channel is formed by a curved surface of said at least one structural ligament.

6. The system of claim 1, wherein each of said structural ligaments connects two sidewalls of a duct forming said bleed slots.

7. The system of claim 1, wherein said channel is configured to reduce the height of at least one of said structural ligaments to sufficiently change a natural frequency of air circulating in a passageway forming said bleed slots and thereby minimizing said non-integral vibrations.

8. The system of claim 1, wherein said rotor blades are located in a compressor section of a gas turbine engine.

9. A process for minimizing non-integral vibrations in rotor blades, comprising the steps of:
    providing a casing having a plurality of bleed slots with at least one of said bleed slots being located in close proximity to a row of rotor blades;
    providing a plurality of structural ligaments with at least one of said structural ligaments extending between two adjacent ones of said bleed slots, wherein said rotor blades rotate about an axis and two opposed ends of said plurality of structural ligaments are inclined at a non-perpendicular angle with respect to said axis;
    fabricating at least one of said structural ligaments to have a reduced height so as to minimize said non-integral vibrations in said rotor blades in said row; and
    forming a channel which extends from a first end of said at least one structural ligament to a second end of said at least one structural ligament.

10. The process of claim 9, wherein said fabricating step comprises creating a gap between an end surface of said at least one structural ligament and at least one valve.

11. The process of claim 9, wherein said channel forming step further comprises forming a curved surface on said at least one structural ligament.

12. The process of claim 9, wherein said fabricating step comprises reducing the height of at least one structural ligaments to sufficiently change a natural frequency of air circulating in a passageway forming said bleed slots and thereby minimizing said non-integral vibrations.

13. The process of claim 9, wherein said fabricating step comprises reducing the height of all of said structural ligaments.

* * * * *